Oct. 16, 1923.
J. H. BUETER
SHOCK ABSORBER
Filed July 11, 1921
1,470,906
2 Sheets-Sheet 1
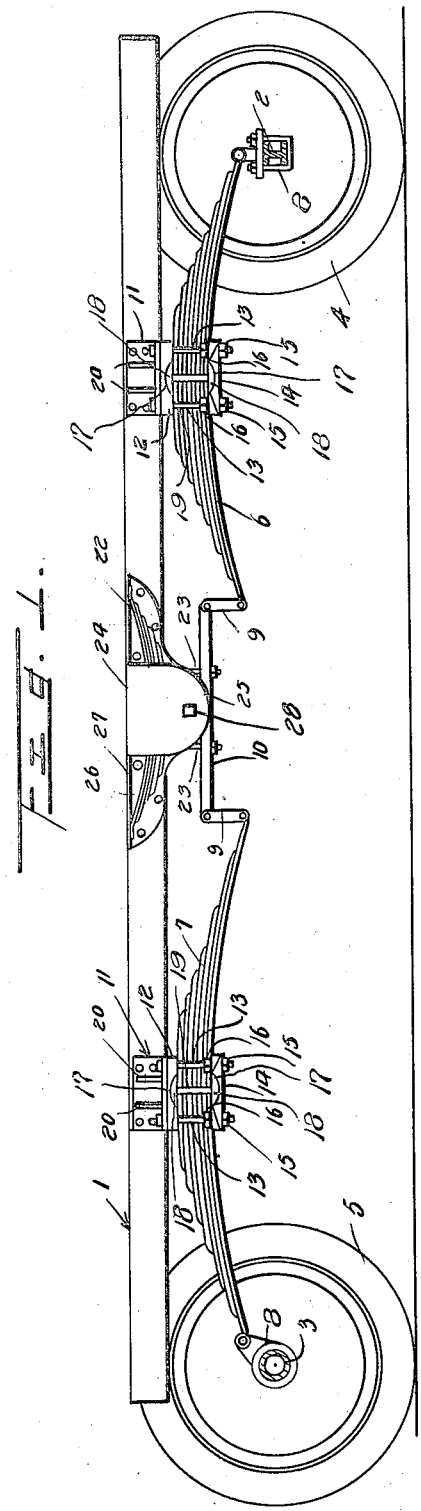
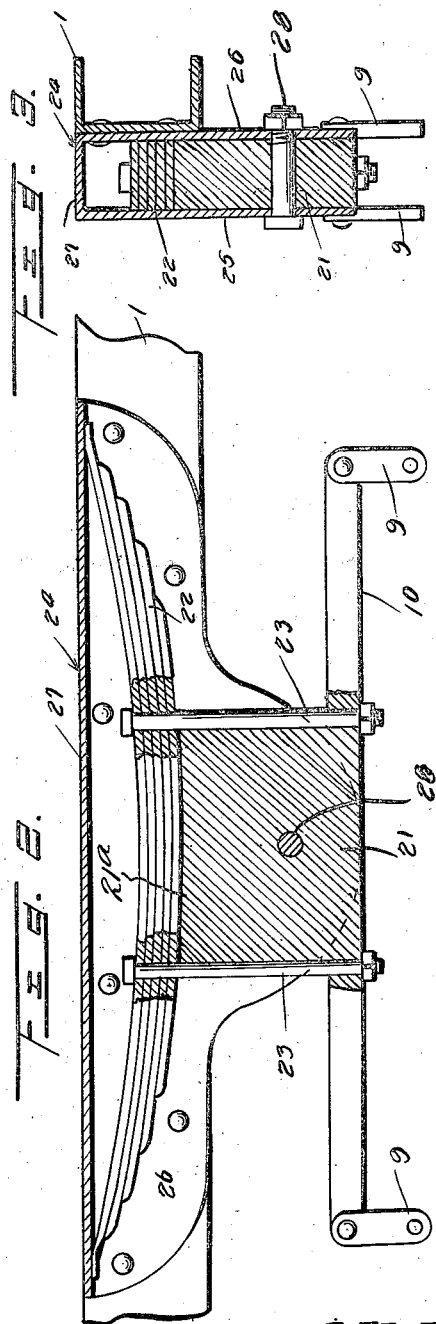
Inventor
J. H. Bueter
By [signature]
Attorney

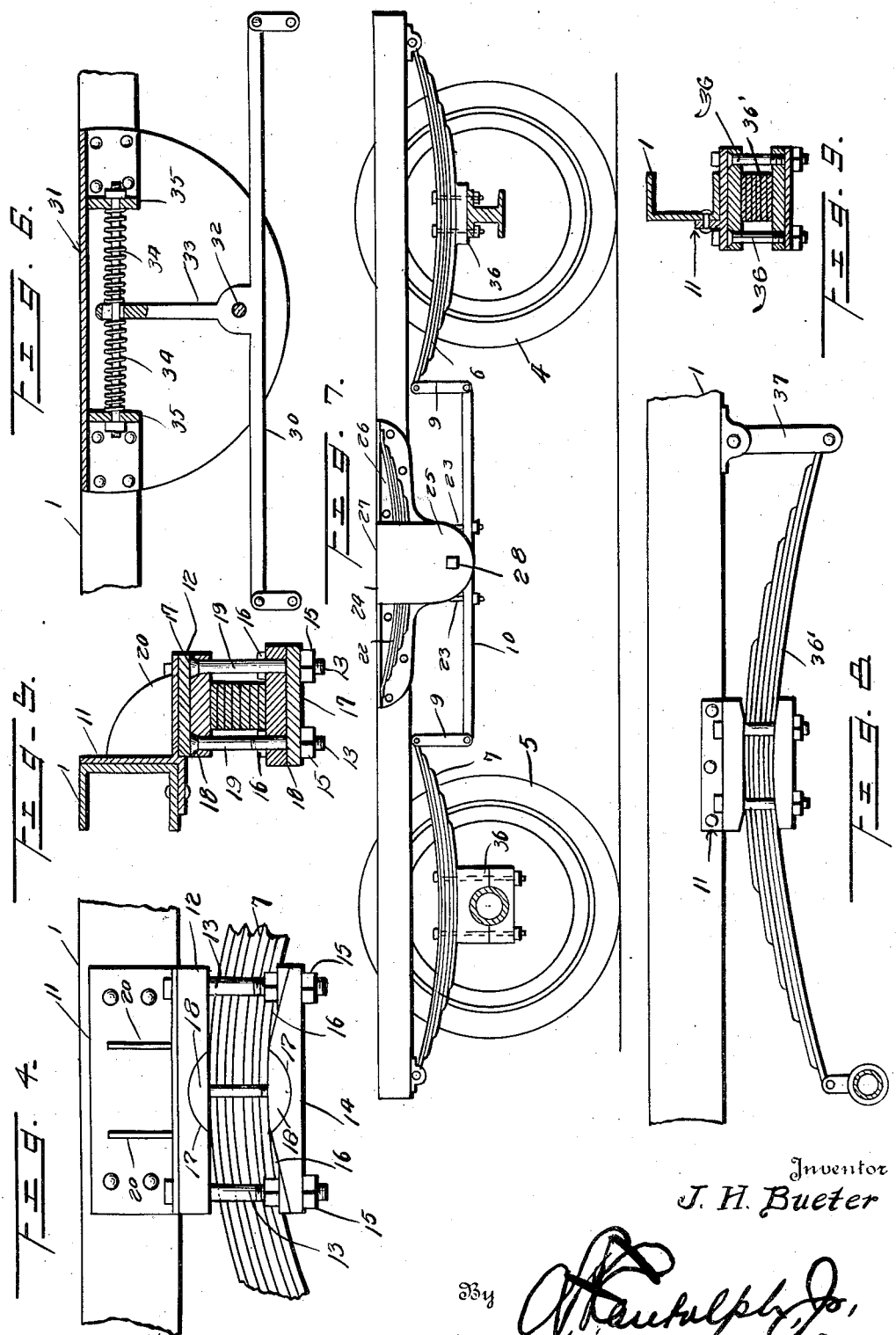

Patented Oct. 16, 1923.

1,470,906

UNITED STATES PATENT OFFICE.

JOSEPH H. BUETER, OF FORT MADISON, IOWA.

SHOCK ABSORBER.

Application filed July 11, 1921. Serial No. 483,736.

*To all whom it may concern:*

Be it known that I, JOSEPH H. BUETER, a citizen of the United States, residing at Fort Madison, in the county of Lee and State of Iowa, have invented certain new and useful Improvements in Shock Absorbers; and I do hereby declare the following to be a full, clear, and exact description of the invention, such as will enable others skilled in the art to which it appertains to make and use the same.

This invention relates to new and useful improvements in shock absorbers for vehicles and has for its primary object the provision of equalizers between the front and rear springs to absorb shocks to the vehicles and to reduce the rebound of the front and rear springs to a minimum, thereby causing light weight vehicles and short wheel base vehicles to ride as smooth as vehicles of heavy weight and of long wheel base construction.

Another object of this invention is the provision of a shock absorber of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1 is a side elevation, illustrating a shock absorber constructed in accordance with my invention and applied to a vehicle, Figure 2 is a vertical sectional view illustrating the equalizer, Figure 3 is transverse sectional view illustrating the same, Figure 4 is a side elevation illustrating a hanger for securing the springs to the vehicle, Figure 5 is a transverse sectional view illustrating the same, Figure 6 is a sectional view illustrating a modified form of equalizer, Figure 7 is a side elevation illustrating a modified form of my invention, Figure 8 is a fragmentary side elevation illustrating the employment of my hanger on an ordinary spring which is attached to the axle and frame, and Figure 9 is a detail sectional view, illustrating the same.

Referring in detail to the drawings, the numeral 1 indicates a chassis of a vehicle supported at its front and rear ends by front and rear axles 2 and 3 that have journaled thereon front and rear wheels 4 and 5. The front and rear axles 2 and 3 have one of the ends of semi-elliptical springs 6 and 7 secured thereto by means of clamps 8. The front and rear springs 6 and 7 have their ends disposed lowermost and adjacent ends are pivoted to shackles 9 that are in turn pivoted to the ends of an equalizing bar or member 10. The front and rear springs 6 and 7 are attached to the chassis 1 by means of hangers 11 which are identical in construction and reference to one specifically is thought sufficient for both. The hanger 11 includes an angle iron bracket 12, the vertical wall of which is riveted or otherwise secured to the chassis 1 while its horizontal wall is provided with spaced openings to receive tie bolts 13 adapted to straddle the spring and pass through a lower clamping plate 14 and have nuts 15 turned on their ends. Adjusting nuts 16 are also turned upon the bolts and are located above the tie plate 14. The horizontal wall of the bracket 11 and the tie plate 14 are provided with recesses 17 to receive semi-cylindrical blocks 18 which are connected together by stud bolts 19 that have their heads countersunk in one of the blocks and their other ends threaded in the other block and are located at opposite sides of the spring thereby forming a pivotal connection between the hanger 11 and the spring. The upper face of the tie plate 14 is cut on an incline in opposite directions from the recess 17 thereof to permit the spring to have a limited pivotal movement between said tie plate and the angle bracket 12 or the horizontal wall thereof. The vertical and horizontal walls of the angle bracket 12 are reinforced and strengthened by webs 20.

The equalizing bar or member 10 has formed integrally therewith an arm 21 provided with a spring seat 21ª which engages a semi-elliptical spring 22 and the latter is secured to said spring seat by means of tie bolts 23. A bracket 24 is riveted or otherwise secured to the chassis 1 and includes side walls 25 and 26 and a top wall 27. The spring 22 passes between the side walls 25 and 26 and has its ends bearing against the top wall 27. A pivot bolt 28 passes through the side walls 25 and 26 and the arms 21 to pivotally connect the equalizing bar or member 10 to the chassis 1.

It will be noted by reference to the drawing that the pivotal movement of the bar or member 10 in either direction will compress the spring 22 and owing to the connection of said bar or member to the opposing ends of the front and rear springs 6 and 7 that the equalizing spring 22 will absorb shocks and reduce the rebound of the front and rear springs to a minimum.

Referring to Figure 6 which illustrates a modified form of equalizer, the bar or member 30 which is connected to the front and rear springs is pivoted to a hanger 31 as illustrated at 32 and has formed integrally therewith a vertically extending arm 33, the free end of which is positioned between coil springs 34 and the latter are disposed against brackets 35 carried by the hanger 31. The springs 34 are mounted upon a rod that extends through the arm 33 and the bracket 35 so that the pivotal movement of the bar 30 in either direction will cause a compression to one spring and permit expansion of the other spring, consequently reducing the rebound of the front and rear springs to a minimum of the vehicle.

Referring to my modified form of invention as shown in Figure 7, the front and rear springs 6 and 7 are secured to the front and rear axles intermediate their ends by brackets 36 and said front and rear springs have their ends disposed uppermost and the outer ends of said springs are attached or pivoted to the chassis 1, while their opposing or adjacent ends are connected to the equalizing bar 10 by the shackles 9.

Referring to Figures 8 and 9 they illustrate my hanger 11 employed on an ordinary spring 36' which has one end secured to the axle and its other end connected to the vehicle frame by the usual shackle 37, thus it will be seen that the hanger is capable of use on the construction of spring and vehicle frame now on the market to increase the riding qualities of such a vehicle.

While I have shown and described the preferred embodiment of my invention, it will be understood that minor changes in construction, combination, and arrangement of parts may be made without departing from the spirit and scope of the invention as claimed.

Having thus described my invention what I claim is:—

The combination with a vehicle frame, of front and rear axles supporting the same, wheels carrying the axles, leaf springs arranged near each side of the frame and extending longitudinally thereof and having their outer ends pivotally connected with said axles, a bracket secured to the frame near each side between the inner ends of said leaf springs, said bracket having a top and spaced inner and outer side walls, a block arranged within the bracket near the inner and outer side walls and pivotally connected therewith, a leaf spring arranged within the bracket upon the upper face of the block, means to clamp the intermediate portion of the last named leaf spring to the upper face of the block, said last named leaf spring having its ends engaging the top of said bracket, arms rigidly secured to the block and projecting longitudinally of the vehicle frame beyond the same, and means for pivotally connecting said arms with the inner ends of the first named leaf springs.

In testimony whereof I affix my signature in presence of two witnesses.

JOSEPH H. BUETER.

Witnesses:
E. H. POLLARD,
CORINNE NUMLEH.